F. HOERNER.
AUTOMATIC TAPPING DEVICE.
APPLICATION FILED JUNE 24, 1920.

1,381,556.

Patented June 14, 1921.

INVENTOR.
Frank Hoerner
BY
Hazard & Miller
ATTORNEYS

UNITED STATES PATENT OFFICE.

FRANK HOERNER, OF LOS ANGELES, CALIFORNIA.

AUTOMATIC TAPPING DEVICE.

1,381,556.  Specification of Letters Patent.  Patented June 14, 1921.

Application filed June 24, 1920. Serial No. 391,422.

*To all whom it may concern:*

Be it known that I, FRANK HOERNER, a citizen of the United States, residing at Los Angeles, in the county of Los Angeles and State of California, have invented new and useful Improvements in Automatic Tapping Devices, of which the following is a specification.

This invention is an automatic tapping device and has for its object the provision of a tapping machine whereby upon the completion of the tapping operation the direction of rotation of the tapping spindle will be automatically reversed for disengaging the tool from the work.

It is a further object of the invention to provide such an automatic arrangement including means for adjusting the point at which the tapping spindle will be automatically reversed so that the device may be employed in connection with tapping operations of varying depths.

The invention will be readily understood from the following description of the accompanying drawings, in which—

Figure 1:
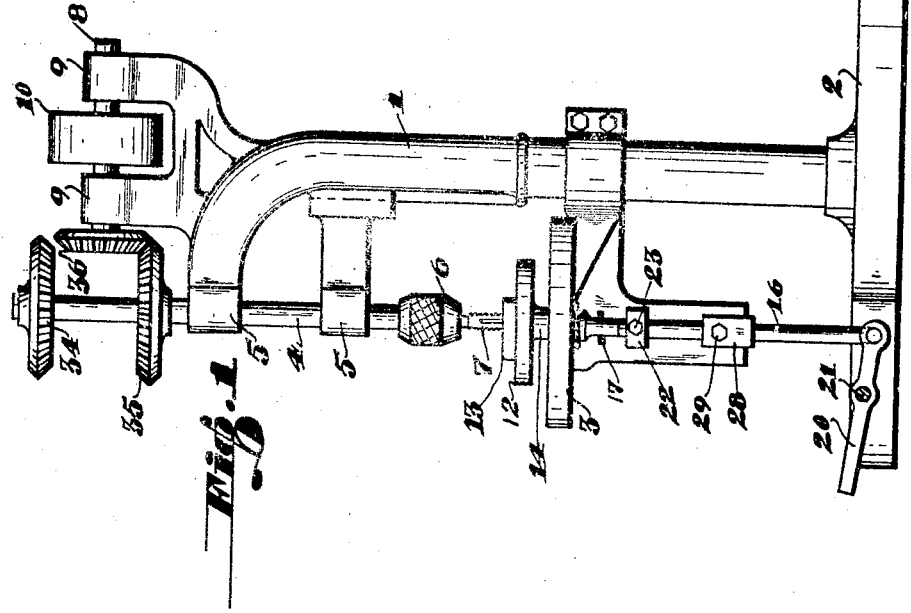
Figure 1 is a side elevation of a machine constructed in accordance with the invention.
Figure 2:
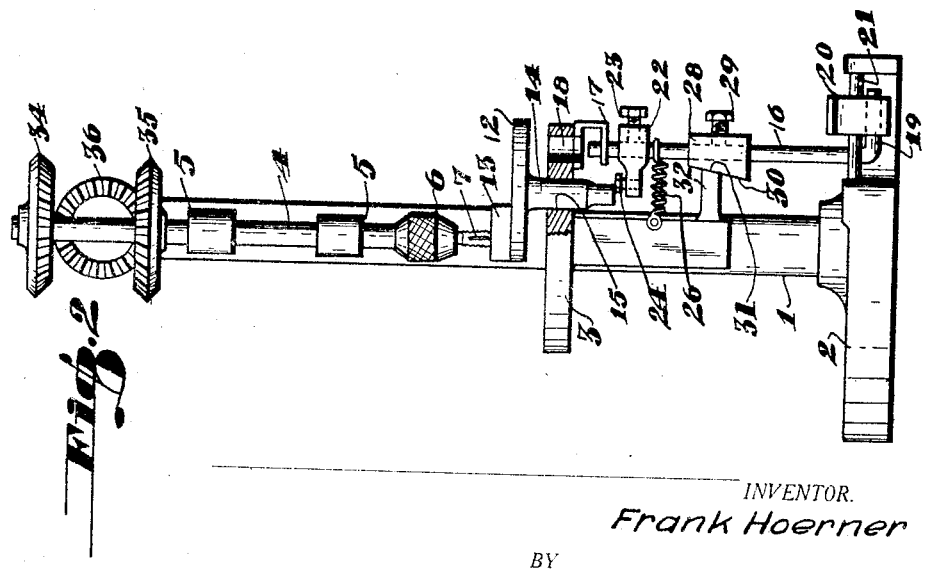
Fig. 2 is a front elevation of the same.

In the embodiment of the invention illustrated the tapping device is shown as comprising a usual main frame 1 upon a base 2 and carrying a usual work table 3. The tapping spindle 4 projects above the work table and is journaled in the main frame at bearing 5 in usual manner. The tapping spindle carries a tool chuck 6 in which may be inserted any usual or preferred tapping tool as shown at 7. A drive shaft 8 is journaled in the usual bearings 9 upon the main frame and is provided with a pulley 10 for forming a driving connection.

A work support is mounted upon the work table 3 so as to be moved up and down relative to the work table and toward and away from the tapping tool. This work support is shown at 12 beneath the tapping tool with a block 13 which is to be tapped supported upon said support in alinement with the tapping tool. The work support is provided with a downwardly projecting shank 14 extending through a suitable aperture 15 provided in the work table 3, and said shank is adapted to be engaged by actuating mechanism for moving the work support and the work carried thereby toward the tapping tool.

The actuating mechanism for the work support comprises a rod 16 arranged to be vertically shifted along side the shank of the work support. The upper end of rod 16 is, preferably, guided in a bracket 17 depending from work table 3 and an aperture 18 is, preferably, provided through the work table in alinement with said rod for permitting of the free upward movement thereof. The lower end of the actuating rod is, preferably, laterally arranged as shown at 19 and said end of the rod is connected to a foot treadle 20 pivoted at 21 to the base of the machine. An arm 22 is adjustable along rod 16 as by means of a set screw 23 and said arm projects laterally from rod 16 into longitudinal alinement with the shank of the work support. A contact screw 24 is arranged in arm 22 so as to abut against the end of shank 14 when the arm is raised with the actuating rod 16, said screw by its threaded engagement in the arm providing an adjustable contact between the arm and the shank of the work support.

The actuating rod 16 is arranged to be shifted laterally so that contact screw 24 may be either free of the shank 14 or adapted to abut against the same. The actuating rod is normally yieldably held in position to cause contact screw 24 to abut against shank 14 as by a coil spring 26 secured at its respective ends to the main frame 1 and to the rod 16. Means are provided for shifting the actuating rod so as to cause disengagement of contact screw 24 from shank 14 as the actuating rod is elevated. As an instance of this arrangement a wedging block 28 is adjustably positioned along rod 16 as by a set screw 29, said wedging block being provided with a tapered wedging surface 30 making contact with a coöperating tapered surface 31 provided upon an arm 32 extending from the frame of the machine.

The mechanism employed for causing reverse rotation of the tapping spindle to provide either a tapping operation or a withdrawal of the tapping tool from the work upon the completion of the tapping operation, is shown as comprising oppositely disposed spaced bevel gears 34 and 35 fixed upon the tapping spindle and arranged to have one or the other of the same in mesh with a bevel gear 36 provided upon drive shaft 8. Longitudinal movement of the tapping spindle is adapted to shift the engagement of bevel gear 36 from one to the other of bevel gears 34—35 so as to reverse the direction of rotation of the tapping spindle, and the tapping spindle is so mounted in the machine as to be readily longitudinally shifted in opposite directions, by the pressure of the work being tapped forced upwardly against the tapping tool, and by the force of gravity of the tapping spindle exerted downward when the pressure of the work being tapped is released from the tapping tool.

In operation the wedging block 28 is adjusted upon contact rod 16 so as to be positioned below the arm 32 and the foot treadle 20 is then actuated for elevating rod 16 and thereby lifting the work support 12 carrying the work in alinement with the tapping tool. When the work engages the tapping tool the tapping spindle will be lifted to cause gear 36 to mesh with gear 35. This driving connection is arranged to cause rotation of the tapping spindle in a direction to perform the tapping operation. As the tapping progresses pressure upon the foot treadle will continuously elevate the work so that it will be engaged by the tapping tool.

The wedging block 28 is so arranged upon rod 16 that when the tapping has progressed to any desired depth the wedging block will have been elevated to a sufficient height to cause the same to abut against arm 32, and the contact between inclined surfaces 30 and 31 will cause lateral movement of the rod 16 and thereby disengage contact screw 24 from the shank of the work support. The work support will thereupon be lowered by gravity so as to remove the pressure against the tapping spindle and as a result the tapping spindle will drop by gravity to disengage gears 35—36 and cause meshing of gear 34 with gear 36. The driving connection thus formed will cause reverse rotation of the tapping spindle and consequently a disengagement of the tapping tool from the work 13.

Thus it will be seen that a construction is provided whereby the direction of rotation of a tapping spindle may be automatically reversed at adjustable points for causing a tapping operation to any desired depth and a subsequent withdrawal of the tapping tool from the work upon the completion of the tapping operation.

Various changes may be made without departing from the spirit of the invention as claimed.

What is claimed is:

1. A tapping device comprising a tapping spindle, a work support, an actuating rod engaging said work support for moving the latter toward said spindle, and means for automatically disengaging said rod from said support at a predetermined point.

2. A tapping device comprising a tapping spindle, a work support, an actuating rod engaging said work support for moving the latter toward said spindle, means for automatically disengaging said rod from said support at a predetermined point, and means for adjusting the point of said disengagement.

3. A tapping device comprising a tapping spindle, a work support, an actuating rod engaging said work support for moving the latter toward said spindle, means for automatically disengaging said rod from said support at a predetermined point, so as to permit movement by gravity of said support away from said spindle upon said disengagement.

4. A tapping device comprising a tapping spindle, means for rotating said spindle, a work support, an actuating rod engaging said work support for moving the latter toward said spindle, means for automatically disengaging said rod from said support at a predetermined point to permit of movement of said support away from said spindle, and means whereby said movement away from said spindle will cause the direction of rotation of said spindle to be reversed.

5. A tapping device comprising a tapping spindle, a work support, an actuating rod engaging said work support for moving the latter toward said spindle, and a wedging surface carried by said rod arranged to laterally shift the same so as to disengage said rod from said support.

6. A tapping device comprising a tapping spindle, a work support, an actuating rod engaging said work support for moving the latter toward said spindle, a wedging surface carried by said rod arranged to laterally shift the same so as to disengage said rod from said support, and means for adjusting said wedge along said rod.

7. A tapping device comprising a tapping spindle, a work support, an actuating rod engaging said work support for moving the latter toward said spindle, means for adjusting said engagement between the rod and support, and means for automatically disengaging said rod from said support at a predetermined point.

8. A tapping device comprising a tapping spindle, a work support, an actuating rod engaging said work support for moving the latter toward said spindle, means for automatically disengaging said rod from said support at a predetermined point to cause movement of said support away from said spindle, spaced driving means upon said spindle, and a driving member operatively connectible with either of said driving means for causing reverse rotation of said spindle, said spindle being arranged to be longitudinally shifted with said work support to make said respective driving connections.

In testimony whereof I have signed my name to this specification.

FRANK HOERNER.